April 7, 1970　　　F. E. COLGAN　　　3,504,697
MOVABLE METER-UNIT RESTRICTION
Filed Jan. 9, 1968

INVENTOR.
FRANCIS E. COLGAN
BY
OSTROLENK, FABER, GERB & SOFFEN
ATTORNEYS

United States Patent Office 3,504,697
Patented Apr. 7, 1970

3,504,697
MOVABLE METER-UNIT RESTRICTION
Francis E. Colgan, Midland Park, N.J., assignor to Auto Research Corporation, Boonton, N.J., a corporation of Delaware
Filed Jan. 9, 1968, Ser. No. 696,530
Int. Cl. F16k 15/00
U.S. Cl. 137—469                 10 Claims

ABSTRACT OF THE DISCLOSURE

In a lubricant distributing system having a pump and a conduit system to supply a plurality of bearings and points, at each bearing and point a high restriction flow apportioning unit associated therewith to control the volume of lubricant supplied thereto; the units each having a bore therethrough with a closed tubular flow restriction means therein having a spiral flow restriction passageway therethrough; the flow restriction means having a flow cut-off valve at the inlet end thereof; the valve is attached to the flow restriction means; the restriction means being normally spring biased in a position to stop flow past the valve; the restriction means being supported in the unit by a device which permits the restriction means to be moved toward or away from the flow cut-off position, respectively, to cut-off or permit flow through the unit.

---

Figure 1:
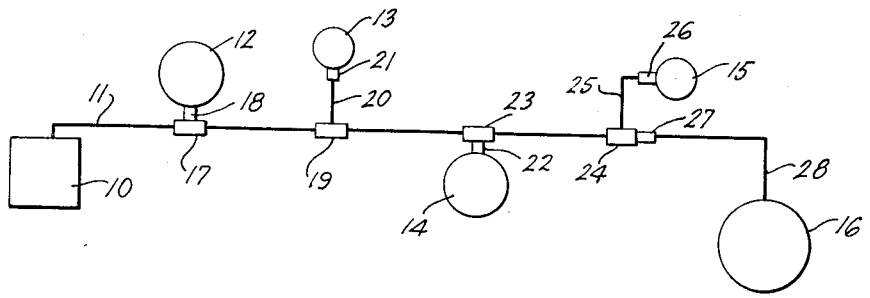

The present invention relates to an installation for lubricating bearings or points and particularly to a movable spiral path flow restriction means in a lubricant apportioning unit for said installation.

In a typical lubricant distribution system, a central lubricant pressure source, with a gear, reciprocating piston or other type of pump, discharges lubricant continuously or intermittently into a branch conduit system leading to a plurality of bearings or points of a machine or a plurality of machines. Each bearing or point requires a small, yet accurately apportioned quantity of lubricant. The lubricant is normally apportioned among the bearings and point by a high restriction meter unit at each bearing or point, each of which units obstructs the flow of lubricant to the particular bearing or point to a predetermined extent, and thereby apportions lubricant. For an example of a system such as that just described, see application Ser. No. 674,201 filed Oct. 10, 1967 by William E. Durnan and Paul H. Reeve entitled "Lubricant Distribution System and Accumulator Used Therein," and assigned to the assignee hereof.

A typical meter unit is comprised of an elongated body formed for instance, of aluminum or brass, with threaded end portions. The threaded end portion at the inlet end of the unit will be attached to junctions along the lubricant delivery conduit system; and the threaded end portion at the outlet end of the unit may be mounted on the bearing, after a period of time the valve becomes fouled with bearing or point by means of a tail pipe.

The meter unit has a bore therethrough. Within a central chamber of the bore in the unit, there may be provided a lubricant flow restriction unit. The present invention is illustrated in conjunction with a meter unit containing a spiral path, flow restriction unit. In the present invention, such a restriction unit is positioned in the bore of the meter unit and is is axially movable within the bore under the force of both lubricant being pumped and of a biasing means. The present invention is also usable in conjunction with any other type of flow restriction element positioned in the bore of a meter unit and movable axially therein, such as a smooth pin.

In a typical meter unit, there is a check valve to prevent back-flow of already pumped lubricant. Typically, such check valves are positioned upstream or closer to the inlet than is the flow restriction unit. However, the check valve can be downstream of the restriction unit. When lubricant under pressure operates upon the check valve, the valve need only open enough to permit bypassage of lubricant, an opening of the order of .001". With such a small opening, after a period of time the valve becomes fouled with the dirt and other impurities in the lubricant being pumped. This prevents the valve from fully closing. The valve leaks and does not prevent lubricant backflow.

One method used for restricting the rate of flow of lubricant through a meter unit is to narrow the diameter of a portion of the length of the bore through the meter unit. However, a check valve cannot be used in conjunction with such a meter unit since the check valve would become fouled as described above.

To overcome this problem, instead of narrowing the diameter of the bore of the meter unit, the meter unit bore is kept constant along its entire length and a floating or unattached elongated pin is placed in the bore. The diameter of the pin is smaller than the diameter of the bore, and the lubricant is provided with a narrow passageway between the pin and the wall of the bore, which causes the required restricting effect. A check valve is placed downstream of the floating pin and the pin is adapted to be pressed, by the pressure of the lubricant being pumped into the meter unit, against the check valve to open the same. Since a large area of the upstream end of the pin is exposed to the full lubricant pressure, the pin exerts relatively great pressure upon the check valve and causes same to open much more than .001", which permits any impurities in the lubricant to freely pass by the wide open check valve without fouling it. The present invention makes use of this principle.

The rate of flow of lubricant pumped through a meter unit may be varied in two ways, first, by narrowing the passageway through which the lubricant can pass, or second, by increasing the length of the passageway through which the lubricant must pass. Both of these methods increase the resistance to the flow of lubricant and reduce the rate of flow.

As a practical matter, the passageway through which the lubricant is pumped cannot be made too narrow because its surrounding wall may trap the impurities in the lubricant, which would interfere with the proper flow of lubricant through the meter unit. In order to obtain the needed resistance to the flow of lubricant without unduly narrowing the flow passageway, it has been known to arrange the narrow passageway for the lubricant in a spiral form, thereby greatly lengthening the passageway through which the lubricant passes. This permits the passageway to be made wider. See U.S. Patent No. 2,992,659 issued to Thomas R. Thomas on July 18, 1961 entitled "High Restriction Metering Unit," and assigned to the assignee hereof.

In meter units containing a spiral restriction flow passageway, the spiral passageway and the element forming the passageway within the meter unit have been stationary within the bore of the meter unit. Therefore, as with the decreased diameter bore meter unit, no check valve could previously be provided for a spiral restriction meter unit since the check valve could only open to a very small extent sufficient to permit lubricant to pass the check valve, with the accompanying check valve fouling.

The present invention overcomes the check valve problem of prior art meter units employing a spiral flow restriction unit by positioning within the bore a restriction unit which is axially movable under the force of both lubricant being pumped and a biasing means, as is the case with the floating pin restriction element.

The restriction unit has a spiral passageway extending through itself from its upstream to its downstream end. The surface of the restriction unit is in liquid tight engagement with the interior surface of the wall of the bore through the meter unit so that all the lubricant under pressure presses on the upstream end of the restriction unit to move the unit and all the lubricant passes through the spiral passageway.

A check valve element is placed at the upstream end of the movable spiral path flow restriction unit. A biasing means, e.g. a spring, biases the restriction unit so that the valve element thereon is pressed against a stationary valve seat. The pressure of lubricant being pumped through the meter unit inlet acts upon the relatively large surface area of the upstream end of the restriction unit and drives the restriction unit and thereby the valve element, away from the valve seat, against the biasing force of the biasing means. This opens a passage leading to the spiral path of the flow restriction unit.

Preferably, the movable restriction unit passes through a flexible diaphragm, O-ring, or other means, which serves to support the unit in a position within the bore of the meter unit so that the valve on the restriction unit properly engages the cooperating valve seat. This support means provides the liquid tight seal to direct all the lubricant through the spiral passageway. If a diaphragm is used, it is flexible to permit axial reciprocating movement by the restritcion element toward and away from the valve seat. If an O-ring or other fixed support is used, it should be sufficiently tight around the restriction unit to preclude leakage, yet sufficiently loose or resilient to permit the restriction unit to slide through it.

A lubricant strainer or filter is desirably positioned adjacent the meter unit inlet upstream of the valve seat.

Accordingly, it is a primary object of the present invention to provide a high restriction flow meter unit for accurately apportioning lubricant to a bearing or point.

It is another object of the present invention to provide such a meter unit having a back-flow check valve which is unlikely to become fouled with impurities, to thereby prevent undesirable valve sticking or leaking.

It is a further object of the present invention to realize the foregoing objects in connection with a meter unit having a movable spiral path flow restriction unit in the path of flow through the bore of the meter unit.

It is a further object of the present invention to provide such a meter unit wherein the movable restriction element performs the restriction function and serves as part of the check valve to control the flow of lubricant to the bearing or point being lubricated.

It is another object of the present invention to provide a lubricant distribution system having a meter unit in accordance with each other of the foregoing objects.

Figure 2:
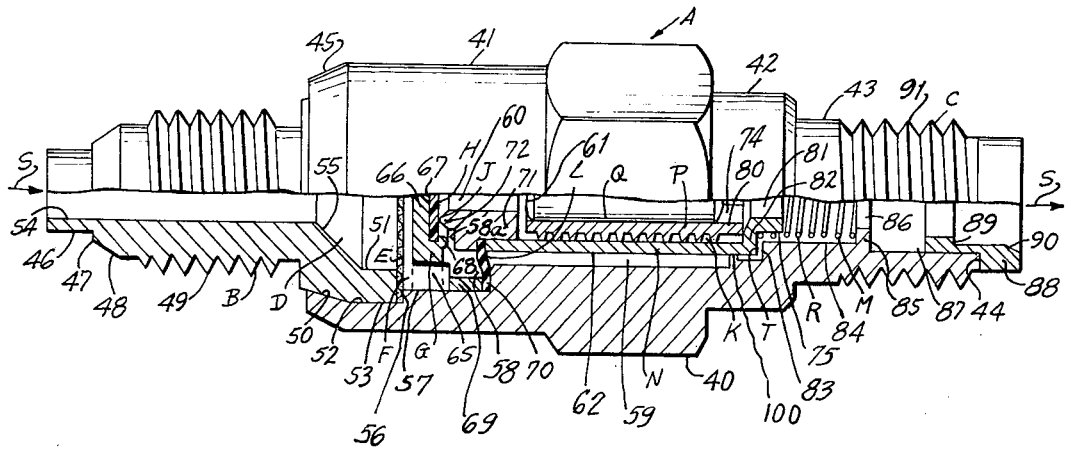

These and other objects of the present invention will become apparent when the following description is read in conjunction with the accompanying drawings, in which:

FIGURE 1 is a diagrammatic lay-out of a lubricant distributing installation; and FIGURE 2 is a side elevational view, partly in section, of a flow meter unit in accordance with the invention, which can be used in connection with the installation of FIGURE 1.

Referring to FIGURE 1, there is shown a central lubricant pressure source 10, comprising a conventional pump, e.g., a rotating gear pump, or a reciprocating piston pump or an eccentric type pump, for supplying charges of lubricant to the branched distributing conduit system 11 at intervals or continuously, in accordance with the requirements of the installation. The main conduit system 11 leads to the bearings 12, 13, 14, 15 and 16.

The main distributing line 11 carries the junction 17 to which the flow meter unit 18 is mounted adjacent the bearing 12. Junction 19 on line 11 has a conduit 20 leading to the meter unit 21 supplying the bearing 13. Junction 23 on line 11 has meter unit 22 mounted on its adjacent bearing 14. End junction 24 on line 11 carries a branch conduit 25 leading to a meter unit 26 mounted on the bearing 15. Meter unit 27 on junction 24 has a tail pipe 28 connecting it to the bearing 16.

A meter unit, like unit 27, is shown in FIGURE 2. Meter units 18, 21, 22 and 26 have a substantially identical interior structure to unit 27 and may contain the invention disclosed herein. However, their end connecting portions, used for mounting them at the bearings or points to be lubricated or for connecting them to tubing or other conduits, vary as the application requires.

The meter unit A has a central portion 40 and an inlet end portion 41 and an outlet end portion 42, 43. The inlet end is provided with a threaded connection portion B and the outlet end is provided with a threaded connection portion C. A first bore extends through portions B, 40 and C, from the meter unit inlet to its outlet. The bore is divided into a number of sections and chambers. The lubricant flow through meter unit A is indicated by the inlet and exit arrows S.

The threaded portion B has an inlet nipple 46 with an inside bore passageway 54. Inlet nipple 46 terminates in the shoulder 47 and the oblique portion 48, which may form part of a compression coupling connection to the outlet opening of junction 24 in FIGURE 1. Portion B also has threads 49 for being screwed into a cooperatingly threaded aperture in the junction 24.

Beyond the threads there is an inlet chamber D, the wall 55 of which is conical and opens toward the inlet strainer or filter E.

The portion B is held in position by the conical end portion 45 at the inlet end of the central portion 40 of the unit A, which is pressed down over the conical face 50 of the unit B. The portion B has a cylindrical surface 52 which is press-fitted inside the interior surface 53 of the end portion 41. Portion B clamps the disc or circular strainer E against the shoulder 56.

The strainer E filters large impurity particles and permits filtered lubricant passing through passageway 54 to flow into an inlet chamber F which is before the valve unit G. The valve unit G is a cylindrical block press-fitted in bore 57 of unit A. Unit G has a plurality of peripheral passageways 65 which lead to annular chamber 58 which communicates with valve seat H. The valve unit G has a press-fitted cylindrical extension 69 fitting inside of the portion 40 and clamping the periphery 70 of the hereinbelow described diaphragm L against a shoulder in the body portion 40. The valve unit G also has a central base 66 which carries the valve seat H in the recess 67. The beads 68 hold the periphery of the valve seat H in position in the recess 67.

The reciprocatory flow restriction unit N is positioned within the bore 59 of the central portion 40. The unit N has the insert 71 secured to its upstream end. Insert 71 clamps the inner periphery of the annular diaphragm L in position and unit N passes through diaphragm L.

The flexible diaprhgam L which is impervious to lubricant, provides a liquid tight seal which ensures that lubricant will through valve J and into bore 60, without being able to by-pass the spiral restriction element P. The diaphragm is flexible to permit axial movement of the reciprocatory unit N with respect to the meter unit. This avoids having to provide a sliding connection between the reciprocatory unit N and the meter unit, through which sliding connection lubricant under pressure might leak.

An O-ring or other inflexible support means may be used in place of the diaphragm L for holding the reciprocatory unit N in position with respect to the meter unit. The O-ring or other support means would be in sufficiently secure engagement with the exterior of the reciprocatroy unit to provide a liquid tight seal, to minimize leakage and to direct all of the lubricant into the spiral passageway. The support means must be spaced away from the reciprocatory unit N or must be resilient enough so that the reciprocatory unit N may freely translate within the bore of the meter unit in a manner to be described.

The unit N is supported at one end by diaphragm L and at the other end by guide 100 over which tube 62 of unit N slides as unit N reciprocates.

Insert 71 has an annular projection 72 which forms the cut-off valve J that cooperates with the valve seat H. To ensure that projection 72 is securely in liquid tight engagement with valve seat H around its entire periphery, either or both of the projection and the valve seat might be comprised of a resilient material which is compressed by being pressed against the cooperating element, thereby forming a secure seal completely around the valve J.

When projection 72 is seated against valve seat H, lubricant flow past valve J out of chamber 58 is precluded. However, when the reciprocatory unit N axially moves to the right, as viewed in FIGURE 2, projection 72 is moved away from valve seat H and lubricant is permitted to pass over the chamber 58, past valve J and into the central bore 60 in reciprocatory unit N. From there, lubricant passes to chamber 61 which leads to spiral path K of restriction sleeve P.

Valve J and valve seat H are illustrated as being upstream of reciprocatory unit N. However, the valve J and seat H may be downstream of a reciprocatory unit, like unit N. Then lubricant under pressure would be directed by the design of the bore and the reciprocatory unit to act upon the downstream end of the reciprocatory unit to move the unit away from the valve seat. The valve seat would be further downstream than the valve element.

The unit N contains an elongated spiral restriction passageway K for the flow of lubricant. The spiral restriction is formed from the tube 62, having a second bore therethrough, in which is press-fitted the spiral restriction sleeve P the exterior of which is expanded by the plug Q into secure engagement with the interior wall of tube 62. The secure engagement ensures that the lubricant pumped into the spiral passageway flows only through that passageway and does not leak around the periphery of the spiral surfaced sleeve. The lubricant that flows through chamber 61 passes through the spiral passageway K of the sleeve P.

The passageway K is spiral to force the lubricant to travel through a long path. The longer the path, the greater the obstruction to the movement of lubricant, whereby the lubricant rate of flow through the meter unit may be restricted.

As illustrated, the spiral path is formed by the cooperation of the spiral groove around sleeve P and the smooth interior or tube 62. Alternatively, sleeve P could be smooth and tube 62 could have a spiral groove around its interior.

The spiral passageway K is formed so as to be fully within unit N. Within the contemplation of the invention, the entire length of the exterior of the reciprocatory unit might engage the interior wall of the bore through the meter unit. A spiral groove would be formed in either the interior of the bore or the exterior of the unit. All lubricant pumped through the meter unit would pass this spiral restriction.

Once past passageway K, lubricant flows through slots 74 cut in the extension 80 of sleeve P. The extension 80 is pressed against shoulder 82 of unit N. The lubricant then flows through the central passageway 81 into the outlet chamber R which contains the coiled return spring M for unit N. One end of spring M fits around the nipple-like end portion 75 of the sleeve N and the other end of spring M is seated upon annular flange 85. Spring M is spaced from the wall 84 of the chamber.

The opening 86 through flange 85 permits the flow of lubricant into the chamber 87. The outlet end of the unit C has an insert 88, press-fitted against the shoulder 44. Shoulder 89 in insert 88 may abut the end of a tail pipe, e.g., 28 in FIGURE 1, and tapered outlet end portion 90 will cooperate with a tubing coupling tail pipe connection.

A meter unit designed in accordance with the teachings of the invention is normally in the position shown in FIGURE 2 where the valve J is closed and the annular projection 72 is in engagement with the valve seat H. The spring M exerts a biasing force on the unit N which securely holds the valve J closed and prevents any backflow of lubricant through the valve J, as well as preventing any undesired forward flow of lubricant to the bearing or point to be lubricated.

In operation, the lubricant under pressure which is pumped into chamber 58 increases the pressure within the chamber 58, and presses against the upstream end surface 58a of reciprocatory unit N. When the pressure on surface 58a increases sufficiently, it shifts the reciprocatory unit N, axially to the right, as viewed in FIGURE 2, compressing the spring M. This opens valve J and permits lubricant flow under restriction through the spiral passageway K to the outlet of the meter unit. Once the valve J begins to open, the lubricant also flows into the chamber 61 where it operates upon the upstream end of both the expansion plug Q and the spiral restriction element P.

During the entire pumping operation, the lubricant pressure within chamber 58 remains elevated and the pressure on surface 58a continuously drives the reciprocatory unit N to the right. The pressure on the restriction element P and on the end of the plug Q cooperate with the pressure on the surface 58a of the reciprocatory unit N to shift the unit N to the right, as viewed in FIGURE 2, to ensure that when valve J opens, the separation between the annular valve element 72 and the valve seat H is large in size. This permits the free passage of lubricant and all the impurities within the lubricant, prevents the impurities from becoming lodged at the valve, and thereby keeps the valve from becoming fouled.

When the system pressure is released after the lubricant pump stops, the spring M axially returns the unit N so that the projection 72 seats against the seat H, closing valve J and both closing off further forward flow and preventing back flow leaks.

There has just been described a high restriction meter unit for a lubricating installation, the unit having a spiral flow restriction unit to which is attached a check valve on the upstream side thereof. The restriction unit is normally biased to close the check valve and under the pressure of lubricant being pumped, the restriction unit is forced against its normal bias to open the check valve fully and permit exiting of the lubricant.

The benefits of the invention are realized because it is not merely the check valve that opens and closes, but because the entire restriction unit moves as the check valve opens and closes. This ensures that the restriction unit, and thus, the valve itself are moved far from the valve seat so that lubricant can flow freely and wash any impurities away from the valve.

The embodiments of the invention in which an exclusive privilege or property is claimed are defined as follows:

1. In a meter unit for apportioning lubricant flow volume in a lubricant distributing system, said meter unit comprising, a body having a bore therethrough, an inlet and an outlet for said bore, a flow restriction unit within said bore;

a check valve in said bore for preventing back-flow of lubricant; said check valve comprising a valve seat and a valve element for engaging said seat and for halting flow past said valve;

the improvement comprising, said flow restriction unit comprising a separate unit within said bore which is axially movable with respect thereto;

said flow restriction unit comprising a spiral passageway within bore for restricting the flow of lubricant through said bore;

one of said valve seat and said valve element being attached to said flow restriction unit and the other of said valve seat and said valve element being fixedly supported within said bore; and a biasing means in engagement with said flow restriction unit for biasing same so that said valve seat and said valve element are normally in engagement; said flow restriction unit being positioned so that lubricant entering said bore under pressure through said inlet moves said flow restriction unit against the force of said biasing means thereby opening said check valve.

2. In the meter unit of claim 1, the improvement further comprising,
said check valve being closer to said inlet than said restriction unit.

3. In the meter unit of claim 2, the improvement further comprising,
a flexible diaphragm within said bore and attached to block flow therethrough;
said flow restriction unit passing through said diaphragm, being secured thereto, and being in liquid tight engagement therewith,
whereby lubricant being pumped through said inlet is directed by said diaphragm to flow only past said restriction unit to said outlet, and whereby said restriction unit is enabled to axially move with respect to said bore.

4. In the meter unit of claim 1, the improvement further comprising,
said valve element being attached to said flow restriction unit and said valve seat being fixedly supported within said bore.

5. In the meter unit of claim 4, said biasing means comprising a spring having two ends; one end of said spring ends being in engagement with said flow restriction unit; an abutment support for said spring fixedly secured within said bore; said spring having its other end in engagement with said abutment support.

6. In the meter unit of claim 4, the improvement further comprising,
said check valve being closer to said inlet than said restriction unit.

7. In the meter unit of claim 4, said flow restriction unit comprising a sleeve having a second bore therethrough and a restriction element in said second bore for restriction of flow through said second bore.

8. In the meter unit of claim 7, said flow restriction element having an exterior surface; said second bore being surrounded by an interior wall; said exterior surface being in engagement with said interior wall surrounding said second bore; one of said exterior surface and said interior wall having a spiral groove along its length through which groove passes lubricant being pumped past said restriction element.

9. In the meter unit of claim 8, the improvement further comprising,
said check valve being closer to said inlet than said restriction unit.

10. In the meter unit of claim 9, said biasing means comprising a spring having two ends; one end of said spring ends being in engagement with said flow restriction unit; an abutment support for said spring fixedly secured within said bore; said spring having its other end in engagment with said abutment support.

References Cited

UNITED STATES PATENTS

| | | | |
|---|---|---|---|
| 675,854 | 6/1901 | Emery | 137—496 |
| 2,411,392 | 11/1946 | Saville | 137—504 XR |
| 2,671,989 | 3/1954 | Schwartz | 137—484.2 |
| 2,981,279 | 4/1961 | Beck | 251—121 XR |
| 2,992,659 | 7/1961 | Thomas | 138—41 XR |
| 3,297,260 | 1/1967 | Barlow | 137—496 XR |
| 3,392,750 | 7/1968 | Soberski | 137—496 |

M. CARY NELSON, Primary Examiner

ROBERT J. MILLER, Assistant Examiner

U.S. Cl. X.R.
137—496